US006577414B1

United States Patent
Feldman et al.

(10) Patent No.: US 6,577,414 B1
(45) Date of Patent: Jun. 10, 2003

(54) SUBCARRIER MODULATION FIBER-TO-THE-HOME/CURB (FTTH/C) ACCESS SYSTEM PROVIDING BROADBAND COMMUNICATIONS

(75) Inventors: Robert D. Feldman, Red Bank, NJ (US); John A. Stiles, Boonton Township, NJ (US); Gordon C. Wilson, New York, NY (US); Thomas H. Wood, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/253,823

(22) Filed: Feb. 19, 1999

Related U.S. Application Data

(60) Provisional application No. 60/075,362, filed on Feb. 20, 1998.

(51) Int. Cl.[7] ................................................ H04J 14/02
(52) U.S. Cl. ....................... 359/125; 359/167; 359/168; 725/129
(58) Field of Search ........................ 359/125, 167–168; 725/129

(56) References Cited

U.S. PATENT DOCUMENTS

| | | | | |
|---|---|---|---|---|
| 5,202,780 A | * | 4/1993 | Fussganger | 359/125 |
| 5,245,459 A | * | 9/1993 | Faulkner et al. | 359/125 |
| 5,325,223 A | | 6/1994 | Bears | 359/137 |
| 5,349,457 A | | 9/1994 | Bears | 359/118 |
| 5,694,234 A | | 12/1997 | Darcie et al. | 359/125 |
| 5,701,186 A | * | 12/1997 | Huber | 359/125 |
| 5,793,506 A | * | 8/1998 | Schmid | 359/125 |
| 5,822,102 A | * | 10/1998 | Bodeep et al. | 359/167 |
| 6,144,471 A | * | 11/2000 | Eyberg et al. | 359/125 |

OTHER PUBLICATIONS

Earl Langenberg and Mani Ramachandran, *Fiber to the Home or Premises—A Single Network Solution*, 69–82 and 2–page addendum, Jan. 28–30, 1998, San Antonio, Texas.
N. J. Frigo, *A Survey of Fiber Optics in Local Access Architecture*, 461–522, 1997.

* cited by examiner

*Primary Examiner*—Kinfe-Michael Negash

(57) ABSTRACT

A passive optical network is provided that integrates signals carrying broadcast CATV services into a FTTH/C network that also provides high-speed Internet access and telephony. Essentially all residential telecommunications services are provided in a single network, based on a single fiber and a single simple transceiver in an optical network unit. Multiple services (e.g., analog video, digital video, cable-modem based Internet access) are multiplexed using separate rf subcarriers (subcarrier multiplexing or SCM) and the delivered signals are compatible with existing consumer appliances (e.g., TVs, VCRs, cable modems, etc.). The system and method combines a bi-directional network with dedicated upstream and downstream networks so that the most expensive and extensive portion of the network (the bi-directional outside plant infrastructure) need not be duplicated for each direction, while the use of two separate dedicated upstream and downstream networks further upstream facilitates flexible provisioning of bandwidth for each direction independently.

22 Claims, 5 Drawing Sheets

SUBCARRIER MODULATION FIBER-TO-THE-HOME/CURB (FTTH/C) ACCESS SYSTEM PROVIDING BROADBAND COMMUNICATIONS

REFERENCE TO PROVISIONAL APPLICATION

This application is based on a Provisional Application, Ser. No. 60/075,362, filed on Feb. 20, 1998, incorporated herein by reference.

TECHNICAL FIELD

This invention relates to the field of optical communications systems.

BACKGROUND OF THE INVENTION

Most residential communications systems, including connections to the Internet, use twisted-pair, copper wire lines that were designed only for narrowband telephony. Most residential Internet connections rely on, at best, 56 kb/s dial-up modems connected to the copper wire lines. When compared with the speed available from fiber optic lines, the use of the twisted-pair copper wires and/or 56 kb/s modems creates an access bottleneck for the user.

In some areas, optical fiber is being used to replace traditional twisted-pair copper wires; typically, however, this process occurs only at the central network level, no closer to the home than the last switch or access server. Extending fiber deeper into the network can be an important part of relieving the access bottleneck. Many attempts have been made to extend a fiber to the home (FTTH, serving a single living unit), curb (FTTC, serving approximately 16 living units), or cabinet (FTTCab), serving approximately 100 living units). Most involve a Passive Optical Network (PON), which runs one feeder fiber from the central office out to a passive terminal, then distributes the transmitted signals over distribution fibers to each of typically 16–32 optical network units (ONUs). The ONUs convert from optics to electronics at or near the home. PONs reduce cost by sharing the costly central office optoelectronics and feeder fiber over many ONUs.

Much research has been devoted to exploring PON architectures. Recent work has centered on applications of dense wavelength division multiplexing (DWDM). DWDM has been tremendously successful in the long haul arena (e.g., connectivity from one city to another) and is beginning to find applications in metropolitan-area systems (e.g., connectivity within a city). One proposed DWDM-based PON uses a wavelength routing device, such as a waveguide-grating router, at the passive terminal of the PON to provide a single, dedicated wavelength (carrying extremely broadband services) to every ONU. Such a system is described in "A Survey of Fiber Optics in Local Access Architectures," N. J. Frigo, Optical Fiber Telecommunications IIIA, pp 461–522 (1997), incorporated herein by reference. Unfortunately, implementing DWDM PONs presents many technical challenges that will be costly to solve, and at this time it does not appear that the costs can be justified for access applications (i.e., applications which provide connectivity to the home).

An alternative approach that appears more promising is to use an optical power splitter at the passive terminal of the PON. A large international group of service providers and equipment vendors, known as the Full Services Access Network (FSAN) consortium, has been working to create a standardized PON carrying data with baseband transmission in ATM cells using this power-splitting approach. The hope is that standardizing the fiber access systems will lead to economies of scale so that these systems become more affordable. The FSAN is a fully-digital system that operates bidirectionally at 155 Mb/s for FTTH. For FTTC or FTTCab, the downstream bit rate (from the central office or head end to the ONUs) could be increased to 622 Mb/s, while the upstream rate would remain at 155 Mb/s. In these PONs, the bandwidth is shared among 16–32 ONUs.

Despite much technical work and many FTTH/C system trials, actual deployments have been limited, primarily because of the difficulty of generating enough revenue on these networks to justify their high installed-first-cost (the capital outlay required before any revenue can be generated) which is dominated by the civil works necessary to install the new fiber (e.g., digging trenches and stringing cables on telephone poles).

To date, broadcast cable television (CATV) is the only residential broadband service that has been widely implemented. Newer CATV systems are hybrid fiber-coax (HFC) networks, with an optical fiber terminating in a fiber node serving 500–2000 homes followed by an extensive coaxial network. CATV networks have been used, in the past, as downstream networks for delivering analog television, and they are optimized for delivering this service economically. Digital video has recently been added to many CATV networks, and two-way services (e.g., cable modems, telephony, pay-per-view video) are beginning to be added as well.

However, the extensive coaxial network is problematical for many advanced applications. Since the coax network is essentially a shared bus, any noise ingress or nonlinearity can detrimentally affect many customers. Even a small degradation in any of the connectors, taps, drop cables, or in-home wiring can produce an opportunity for system-wide noise ingress and other problems. Even with fiber nodes serving fewer than 500 homes, the signal attenuation in the coaxial plant requires several radio-frequency (rf) amplifiers in series between the fiber node and the farthest customer in order to provide a signal of adequate strength. Because coax loss increases with frequency, increasing the system bandwidth requires more amplifiers, and each amplifier adds noise and distortion to the transmitted signal. Thus, practical system bandwidths are limited to approximately 550–860 MHz. Furthermore, the rf amplifiers must be powered, and carrying the power on the coax can accelerate its corrosion. Even in a "clean" coax plant that has been carefully engineered and maintained so as to minimize ingress noise, the available bandwidth for return of signals from the home to the head-end is limited.

SUMMARY OF THE INVENTION

An advance is made over the prior art in accordance with the principles of the present invention directed to the integration of signals carrying broadcast CATV services into a FTTH/C network that also provides high-speed Internet access and telephony. Essentially all residential telecommunications services are provided in a single network, based on a single fiber and a single simple transceiver in an optical network unit. Multiple services (e.g., analog video, digital video, cable-modem based Internet access) are multiplexed using separate rf subcarriers (subcarrier multiplexing or SCM) and the delivered signals are compatible with existing consumer appliances (e.g., TVs, VCRs, cable modems, etc.).

According to a first embodiment of the present invention, a method is provided for delivering CATV and data signals from a headend to a service subscriber, comprising the steps of combining the CATV and data signals from the headend into a composite optical signal; transmitting the composite optical signal downstream over a passive optical network (PON) using coarse wavelength division multiplexing (CWDM) for duplexing; converting the transmitted composite optical signal to electrical signals; and routing the electrical signals to the service subscriber for use.

Viewed from another aspect, the present invention is directed to an apparatus for delivering CATV and data signals from a headend to a service subscriber, comprising an optical combiner connected to receive the CATV and data signals from the headend; a passive optical network (PON) connected to an output of the transmitter; and an optical-electrical converter (OEC) connected to the PON, wherein the CATV and data signals are combined into a composite downstream optical signal and transmitted via the PON to the OEC and then delivered to the service subscriber for use. In a preferred embodiment the OEC is located on the subscriber's premises, and the upstream signals are received from the subscriber over the PON and routed over a dedicated upstream network to the headend in a different wavelength band than the downstream signals.

Further features and advantages of the present invention, as well as structure and operation of various embodiments of the present invention are described in detail below with reference to the accompanying drawings.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
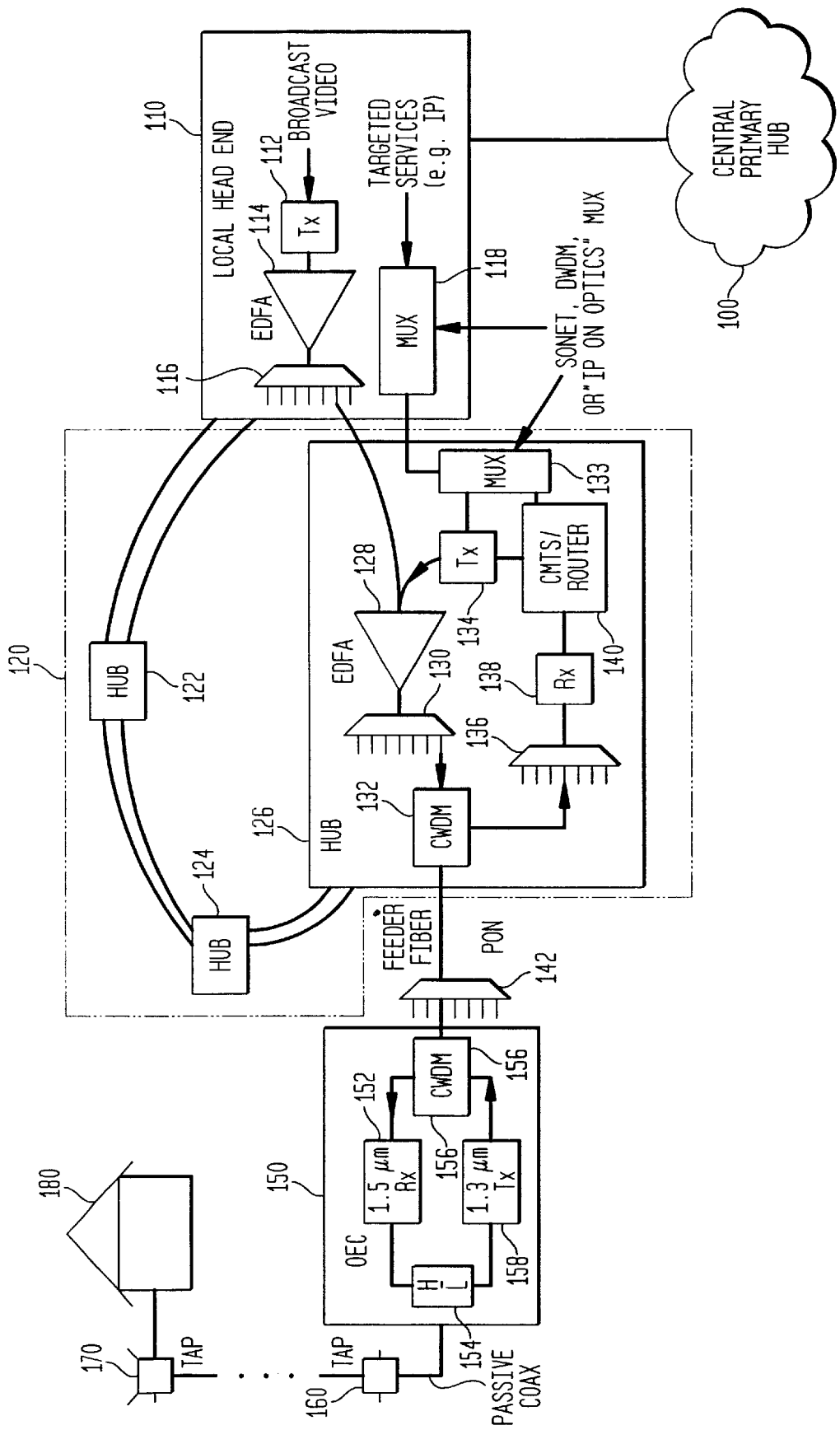
FIG. 1 is a simplified block diagram of an optical communications network according to the present invention.

An overview of the architecture of a preferred embodiment of the present invention is shown in FIG. 1. A local headend 110 serves approximately 100,000 users and receives video signals in baseband format from a central primary headend 100, where they are received from a satellite or from local broadcasters (not shown). Local headend 110 includes a transmitter 112 which receives broadcast video signals that are amplified by an amplifier 114 (e.g., an EDFA). The output of amplifier 114 is connected to an optical splitter 116. Local headend 110 also includes a multiplexer 118 which receives target services (TS) such as Internet Protocol (IP) data and narrowcast video channels.

At the local headend 110, any uncompressed digital video signals are converted in a known manner to a compressed (e.g., MPEG-2) format. All digital signals are modulated onto subcarriers using quadrature amplitude modulation (QAM) (or an equivalent thereof) and all analog video is modulated onto subcarriers using amplitude modulation with vestidual sideband (AM-VSB) (or an equivalent thereof). The modulated signals are then transported to a path-redundant supertrunking ring 120 comprising hubs 122, 124 and 126, each hub serving roughly 20,000 users. Each output of the splitter 116 connects to one of the hubs 122, 124, and 126. While the supertrunking ring 120 exemplified in FIG. 1 comprises 3 hubs, obviously there could be more or less depending upon the system needs.

The targeted services (TS) are typically carried together from the local headend 110 to the hubs 122, 124, and 126 over separate fibers using either SONET or one of a number of proprietary data transport systems via multiplexer 118.

Hub 126 is typical of each hub in the supertrunking ring 120. Hub 126 comprises a downstream broadcast video path which includes an amplifier 128 having an output connected to an optical splitter 130, each output of which is, in turn, connected to a coarse wavelength division multiplexer (CWDM) 132. A targeted services path has an outgoing (downstream) leg which directs targeted service signals through multiplexer 133 to transmitter 134, which outputs the signal to amplifier 128. The downstream broadcast signals are amplified at amplifier 128 and split in the hub at optical splitter 130 without regeneration. Hub 126 amplifies both downstream broadcast video and downstream TS signals and combines them into a single composite optical signal, which is transmitted through CWDM 132 to an Optical-Electrical converter (OEC) 150 described in more detail below.

A return (upstream) leg for the targeted services path receives upstream signals from CWDM 132, travels through an optical combiner 136, to a receiver 138, and into a cable modem termination system (CMTS) and associated IP router 140.

Unlike HFC, which uses dedicated downstream and upstream feeder fibers to connect the hub to remote fiber nodes (and thus requires the installation of vast amounts of fiber), the present invention employs PONs 142 (including an optical splitter and the feeder fiber and distribution fiber connected thereto) that carry the composite signal along a single feeder fiber and terminate at an OEC 150. Each PON 142 carries bi-directional signals via 1.5 $\mu$m/1.3 $\mu$m Coarse Wavelength-Division Multiplexing between CWDM 132 and CWDM 156. The PON 142 divides the downstream composite optical signal into many identical composite optical signals so that they can be distributed to different OEC's (only one OEC is shown in FIG. 1). For upstream signals, PON 142 combines the upstream signals from the plural OEC's onto the feeder fiber and directs them to the hub 126, where they are transmitted back to the local headend for distribution to their respective destinations (ISP, telephone service provider, etc.). Thus, in contrast to the prior art systems, the present invention minimizes the amount of fiber required by utilizing bi-directional composite signals all the way to the OEC, which is located at (FTTH) or near (FTTC) the subscriber location.

OEC 150 converts downsteam optical signals coming from hub 126 (via PON 142) to electrical signals and then transmits them to the subscriber over coax. Likewise, the OEC converts upstream electrical signals coming from the subscriber into optical signals for transmission back to the hub 126. The FTTC OEC serves a plurality of houses via one or more passive coax buses (the coax buses are not needed in FTTH since the OEC is located directly on the subscriber premises). In the preferred embodiment an FTTC OEC serves anywhere from 8 to 100 users depending on the preferences of the network operator and the layout of the neighborhoods served. Coax drops to subscriber homes connect directly to existing in-house coax so that existing Customer Provided Equipment (CPE) (cable-ready TVs, set-top boxes (STBs), cable modems, and IP telephones) can be connected to the network. Although the signal being receive at the subscriber premises is a composite signal, the CPE in the home select appropriate signals by tuning to a particular channel or, in the case of cable modems, by performing time-division demultiplexing on the signal in one rf channel, controlled by the well-known MAC protocol. This negates the need for these functions to be performed by an ONU as is done in prior art systems (the ONU of the prior art, while often including an optical-to-electrical converter, also include components for, among other things, channel selection, signal demultiplexing, etc.).

Figure 2:
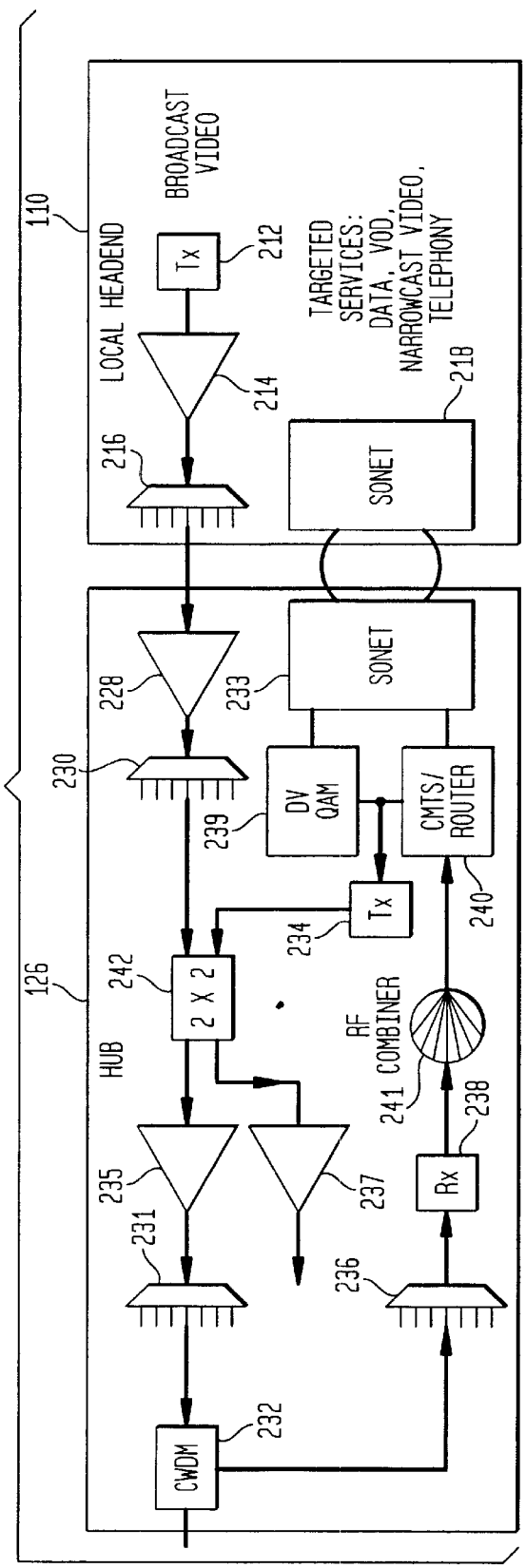
FIG. 2 is a block diagram of the local-headend-to-hub connection of the network of FIG. 1.

Inserting targeted services channels (e.g., data, internet, narrowcast video telephony) at the hub instead of at the headend reduces the number of subscribers sharing the available TS bandwidth. FIG. 2 shows a more detailed view of the data and video TS interfaces, the cable modem termination system (CMTS) and QAM video modulators of the headend 110 and hub 126 of FIG. 1. A separate fiberoptic link 219 transports data and video between the local headend 110 and hub 126 using SONET and/or other known proprietary transport systems. The broadcast signal is split multiple times in the hub (e.g., at splitters 230 and 231), and the degree to which the available TS bandwidth is shared depends on the point in the hub at which the TS signal is combined with (inserted into) the broadcast signal. In FIG. 2, insertion occurs just prior to the last amplifiers 235 and 237 using a 2×2 coupler 242. The wavelengths of the broadcast and inserted TS signals must be different in order to prevent interference noise. However, tight wavelength specification is not necessary since the two signals are not wavelength multiplexed in the hub or wavelength demultiplexed in the OEC.

The TS insertion point can be moved towards the output of the hub 126 to reduce bandwidth sharing. For example, if a WDM combiner is used instead of a 2×2 coupler after the final hub split (i.e., after optical splitter 231 in FIG. 2), then each PON can be allocated its own TS signal.

The return (upstream) signal at 1.3 μm (used for example, for interactive transmissions) can use CWDM to utilize the same fiber as the forward signal as far back as the final hub amplifier, e.g., amplifier 235 in FIG. 2. However, a very-low-crosstalk CWDM would be required at this point since the optical power downstream greatly exceeds that of the upstream. Thus, in the preferred embodiment, the hub CWDM is placed after the final hub splitter (splitter 231 in FIG. 2), where the power difference between the upstream and downstream signals is much less, and a separate optical combiner 236 is used in the upstream. The downstream splitter 231 and upstream combiner 236 can be sized differently to optimize the link budget and resource-sharing for each. As shown in FIG. 2, the outputs of multiple upstream receivers can be passively combined in the rf domain (the SNR penalty for rf combining is less than that for optical combining) prior to demodulation in the CMTS, using RF combiner 241. Reducing the amount of rf and/or optical combining in the hub and using more demodulators improves the upstream power budget, reduces bandwidth sharing, and decreases the size of failure groups. The operator can increase the number of demodulators gradually as the service-take increases, implementing a "pay-as-you-grow" provisioning of equipment.

Figure 3:
FIG. 3 illustrates a typical service bandwidth allocation in accordance with the present invention.

As noted above, in the present invention targeted services are carried in rf subcarriers. FIG. 3 shows a typical service bandwidth allocation in which seventy-seven to eighty 6-MHz NTSC analog-video channels are placed from 50 to 550 MHz. Thirty-three digital-video channels are placed from 550 to 750 MHz. Using 64-QAM, each 6-MHz digital carriers for the thirty three broadcast digital video channels has a capacity of 30 Mbps and thirty three channels can accommodate up to two hundred SDTV or sixty six HDTV programs. From 750 MHz to 1000 MHz, forty two digital carriers with a total capacity of 1.2 Gbps, are reserved for targeted services downsteam information such as cable modem data, VOD, and narrowcast video.

On coax, forward and return signals must reside in separate rf bands to avoid interfering. As in traditional HFC systems, forward (downstream) signals utilize spectrum above 51 MHz while return (upstream) signals are confined to the 5 to 42 MHz band. Using quadrature phase-shift keying (QPSK), this upstream bandwidth will support up to 62 Mbps. Upstream channels are either 1.6 or 3.2 MHz wide and carry either 2.56 or 5.12 Mbps (up to 10.24 Mbps using 16-QAM).

Preferably, more bandwidth is allocated to the downstream than to the upstream. Asymmetry is desirable, both since the downstream supports broadcast services and since data services such as web browsing typically require more downstream than upstream bandwidth. However, if the upstream capacity becomes exhausted, the sharing of the upstream capacity can be reduced without affecting the sharing of the downstream capacity. Initially the 37-MHz upstream band can be shared over many PONs. Later this band can be reused on each PON so that only those users on a single PON share that resource. The sharing can even be reduced to the single OEC level as follows. Since the upstream bandwidth on the fiber leaving the OEC can easily exceed 1 GHz, it is possible to upconvert signals in the OEC into a higher frequency band in a known manner. If each OEC utilizes a different band, then various upstream signals can be combined passively without interference.

Figure 4:
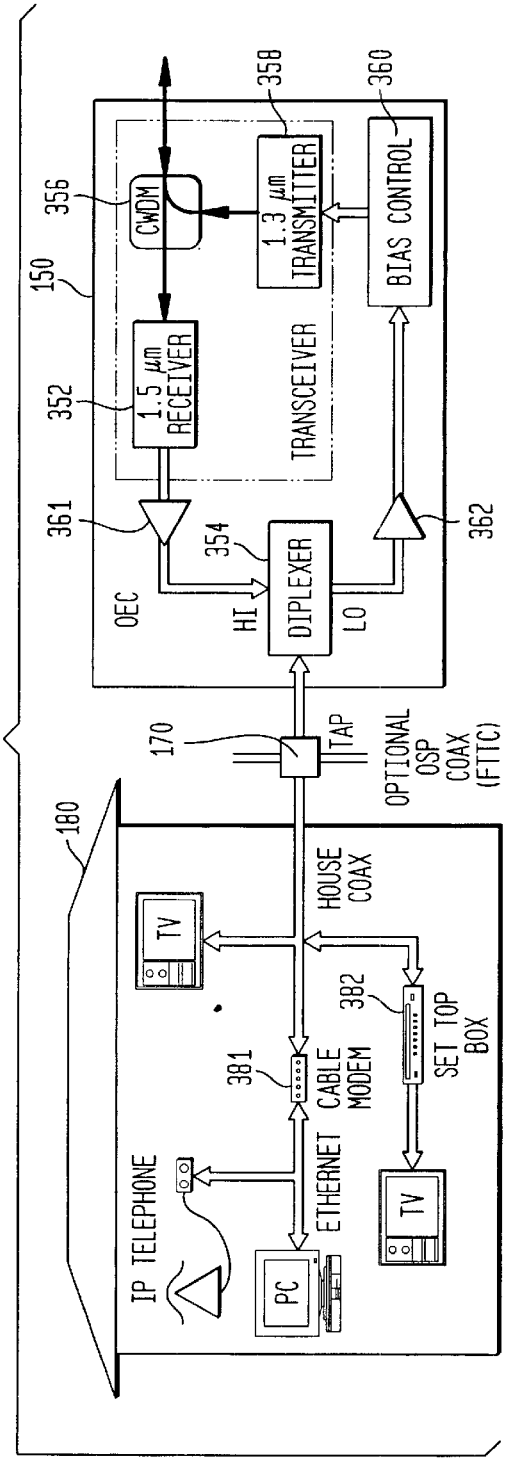
FIG. 4 is a schematic drawing of the OEC and coax connection to a home in accordance with the present invention.

The OEC 150 and the coax connection to the home 180 in a FTTC system are shown schematically in FIG. 4. As the name implies, the OEC is essentially a transparent optical-to-electrical converter. As noted above, the actual data transceivers are in the premises CPE (e.g. cable modem (CM) 381 and set-top box (STB) 382), which also perform ranging and media access control (MAC) functions. Thus, the OEC is much simpler than the ONU used in FSAN PONs, which must perform these functions in addition to O/E conversion. The fact that CMs and STBs exist as mass-produced items reduces the time and resources necessary to develop a system according to the present invention and results in production-cost savings. The OEC is transparent to modulation format and bitrate so that the capacity of the system can be increased without replacing it.

Both the FTTH and FTTC OECs perform essentially the same function. Both can utilize the same optical transceiver 358 and both use an rf diplexer 354 to separate the upstream signal applied to the transmission laser and the downstream signal from the receiver. However, the FTTC OEC hangs from a telephone pole or sits in a pedestal and is powered by the network, while the FTTH OEC is attached to the side of the house and is typically powered by the home. Also, the FTTC OEC must include rf amplification (amplifier 361 and 362 in FIG. 4) in both the upstream and downstream directions to overcome the coax signal attenuation.

Figure 5:
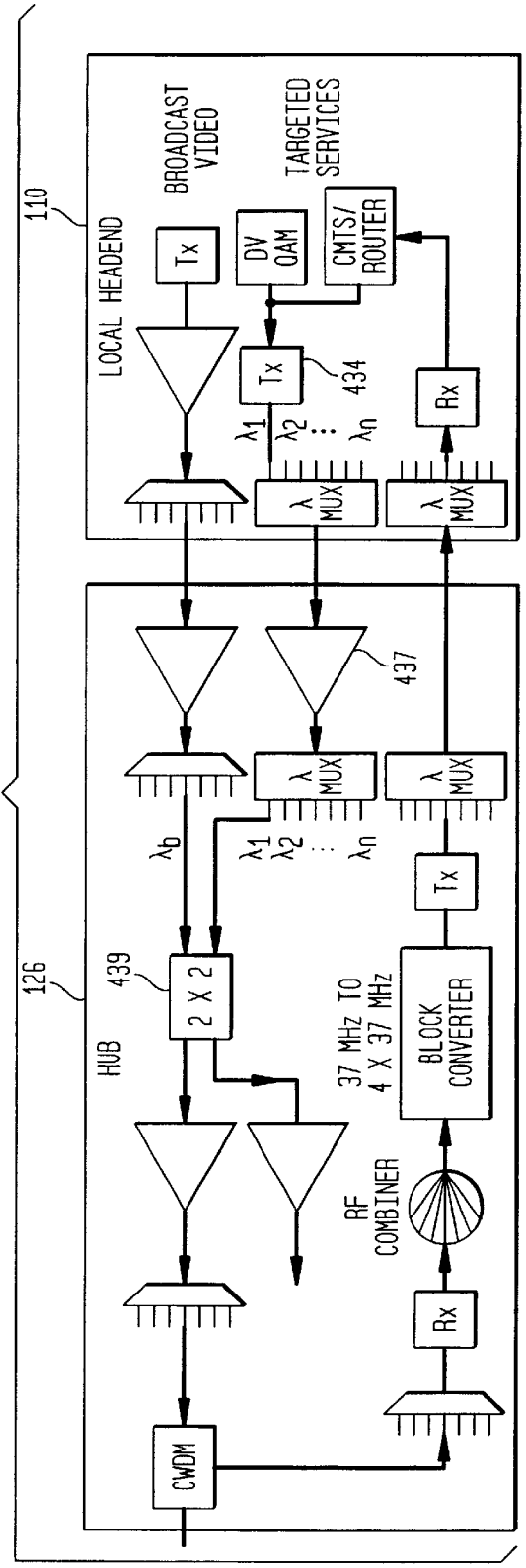
FIG. 5 is a block diagram of the local-headend-to-hub connection of the present invention in which DWDM is utilized.

Some MSOs are experimenting with the use of DWDM to deliver targeted services. The use of DWDM between the local headend and hub eliminates the need for the SONET ring shown in FIG. 2. DWDM can be applied to the architecture of the present invention as shown in FIG. 5. As in FIG. 2, the TS insertion is done optically with a 2×2 combiner 439 in the hub 126. In a DWDM application, however, the TS transmitters are located in the local headend 110 and each is at a controlled wavelength $\lambda, \ldots \lambda_n$. The output from the transmitters are multiplexed at MUX 435 onto one or more fibers and transported to the hub 426. Depending on the loss budget and the output power of the transmitters used, amplifiers 437 (e.g., EDFAs) may be required in the headend 110 and/or hub 126. At the hub 126, the wavelengths are separated and each is inserted onto a different branch of the network. Thus, by putting a channel on a specific wavelength or set of wavelengths, it can be targeted to a specific segment of the network.

Since no demultiplexing is done at the OEC, the TS and broadcast channels must be at different rf frequencies. For example, the broadcast channels might range from 50 to 750 MHz while the TS channels might range from 750 to 1000 MHz. Each TS wavelength reuses the 750 to 1000 MHz band. The sharing of the TS bandwidth can be reduced over time by increasing the number of wavelengths and moving the insertion point further out in the cascade of splitters that starts in the local headend and ends at the outside plant splitter. DWDM could even be extended to the OSP beyond the hub if temperature-compensated WDMs are used.

DWDM can also be used to multiplex multiple upstream signals onto a single fiber. Since the upstream band is only 37 MHz, the number of wavelengths required for a particular level of sharing can be reduced by using block conversion to take the 5 to 42 MHz band from 4 different branches and upconvert them into different bands above 100 MHz, so that each wavelength carries 148 MHz.

Figure 6:
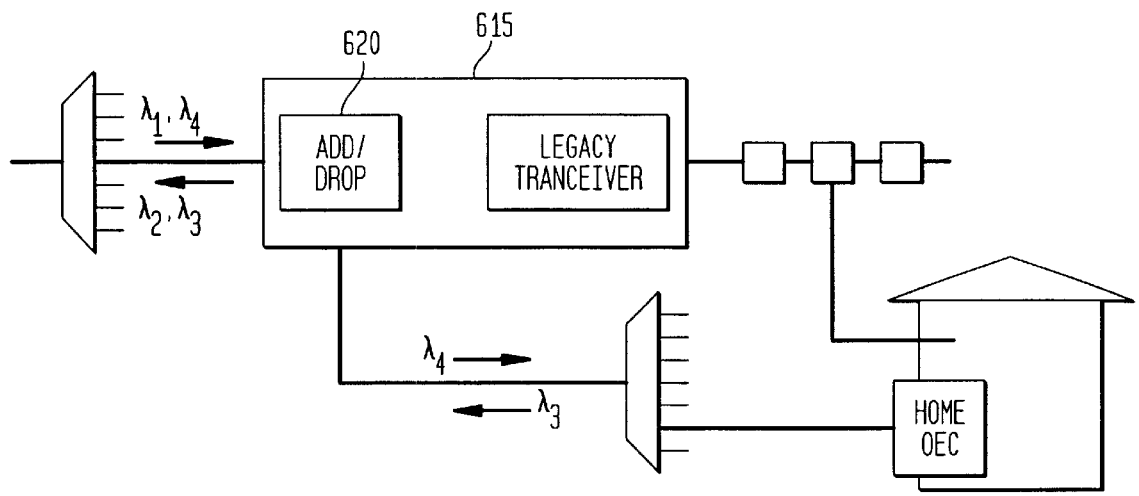
FIG. 6 is a block diagram illustrating an alternative "overlay" FTTH system in accordance with the present invention.

An alternative "overlay" path to FTTH, which can be accomplished on a per home basis without interrupting "legacy" services (existing services based on older technology) such as analog video, is shown in FIG. 6. A wavelength add/drop 620 is placed in the curb OEC 615 that drops a particular downstream wavelength X, which could be in the EDFA band, off the original fiber and onto a new fiber and adds a different upstream wavelength Y from the new fiber onto the original fiber. The FTTH system could either use digital subcarriers or it could be a baseband ATM PON.

Figure 7:
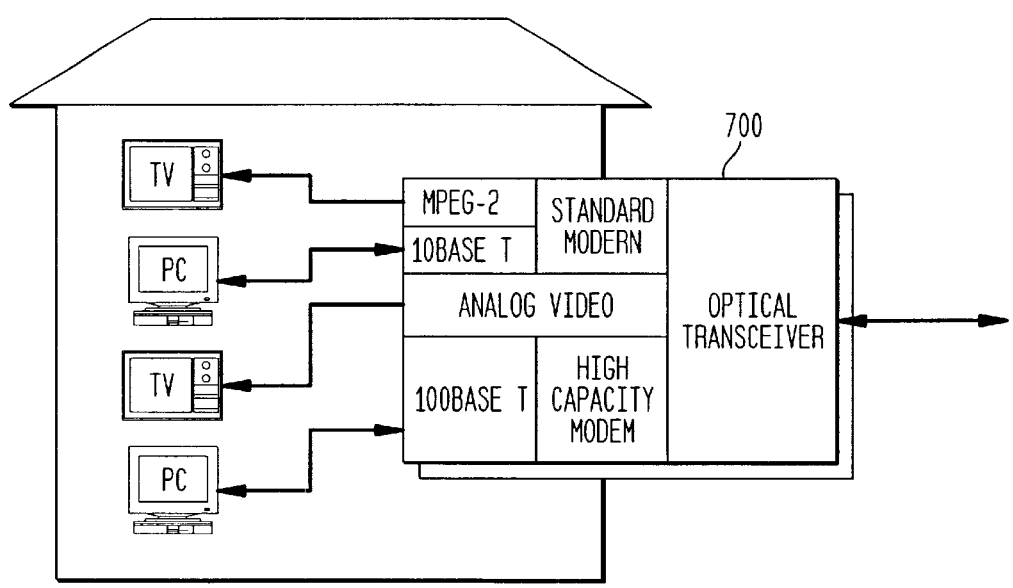
FIG. 7 is a block diagram of an OEC architecture which allows subscribers to select from a group of services available at the OEC in accordance with the present invention.

In another scenario, advanced OECs can be provisioned only to those subscribers that are willing to pay for their added performance and the new services they enable, while customers with legacy OECs continue to receive legacy services. An example of such an OEC is shown in FIG. 7. Modem and STB functions are integrated into the OEC 700. By eliminating the coax bus from these functions, these devices now have access to the full upstream capacity of the fiber and can be configured with high-capacity modems for high-bit-rate services. The OEC 700 is a platform that supports selectable interfaces to various CPE such as 10BaseT, 100BaseT, and MPEG-2 decoded video on Firewire. The OEC can continue to connect to the in-home coax to pass analog television.

Figure 8:
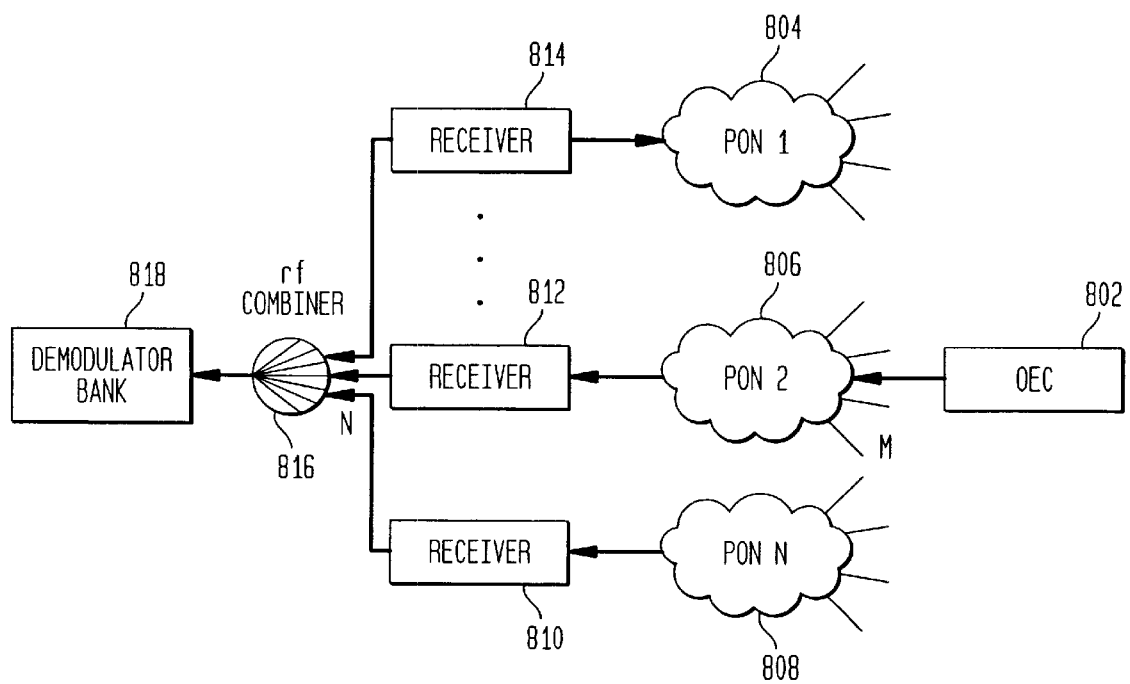
FIG. 8 is a block diagram illustrating an embodiment of the upstream leg of the present invention.

FIG. 8 illustrates, in more detail, an embodiment for combining upstream signals from a plurality of OECs onto a single demodulator bank using a combination of passive optical networks and RF combining. A plurality of OEC's 802 (only one shown in FIG. 8) are connected to a demodulator bank 818 via a plurality of PON's (804, 806, 808). Each PON is in turn connected to a receiver (810, 812, 814), the outputs of which are combined via rf combiner 816 onto demodulator bank 818. Each OEC 802 can be connected to a coax system (e.g., for FTTC) or directly to a subscriber premises (for FTTH). Signals can be carried upstream from the OEC 802 using a combination of SCMA and TDMA. Each demodulator bank 818 demodulates up to K subcarriers, where K is limited by the upstream capacity of the upstream link (e.g., in HFC networks, 37 MHz is allotted to the upstream, so up to twenty-three 2.56 Mbps channels can be supported). Optical signals from M OECs are combined passively in the plurality of PONs (804, 806, 808), with the signals from each PON being input onto a receiver. The plurality of PONs reduces the number of receivers and feeder fibers required, and thereby reduces the cost of the system.

The RF outputs from N receivers are passively combined using the RF combiner 816 onto the demodulator bank 818. Thus, a total of MN OEC's are connected to a single demodulator bank and share up to K subcarriers. Because RF combining degrades the carrier-to-noise ratio (CNR) less than does optical combining, a larger number of OECs can be combined onto a single demodulator bank with RF combination than with optical combination alone.

Regarding upgradeability, a system can be designed with a large value of MN initially, when the demand for upstream capacity is relatively small, in order to minimize the number of demodulator banks that must be provided. As the demand for upstream capacity increases, the number of OEC's sharing a single demodulator bank can be decreased by increasing the number of demodulator banks and decreasing the RF combination ratio N. Thus, the average bandwidth availability can be increased without changing the PONs in any way. Also, the product MN can be changed without changing the sharing of the downstream transmitting bandwidth because that sharing is dictated by a separate set of splitters (216, 230, 231 in FIG. 2).

Subcarrier multiplexing enables the flexible, scalable, and modular properties of the present invention. Since different services reside on different rf channels, the mix of services can be tailored to evolving market opportunities simply by changing the mix of channels. The number of channels dedicated to TS in the above example is probably more than is needed initially. With fewer TS channels, the operator has the option of either increasing the number of broadcast video channels or of not populating the entire 1 GHz band. The band can be populated later by adding additional modulators.

SCM allows for cheap demultiplexing at the home. If all 45 TS channels shown in FIG. 3 are devoted to data, the aggregate downstream capacity is 1.2 Gbps. Yet, only a small fraction of that traffic is intended for each home. With SCM, a simple rf tuner in the cable modem located in the home selects 1/42 of the total traffic, and the cable modem receiver electronics need only operate at 30 Mbps. By contrast, in a TDM baseband system of the same aggregate capacity, the home receiver and demultiplexing electronics would need to operate at 1.2 Gbps—a more expensive proposition.

Moreover, with SCM, the modulation format and bit-rate need not be the same in every channel. As long as the relative levels of each channel are appropriately balanced to obtain the required carrier-to-noise ration (CNR) for each format, the same link can carry AM-VSB and M-ary QAM channels, with the constellation size (number of distinct symbols) M ranging from 2 to 256. Furthermore, if a particular subscriber needs higher peak bit-rates than standard-cable modems can accommodate, that subscriber could purchase a special high-capacity modem and be allocated a dedicated "fat" channel with higher capacity. A business subscriber or a residential subscriber transmitting video content might select this option to improve their upstream capacity.

Because multiple OECs are connected to a common hub receiver, the system is subject to noise such as random intensity noise (RIN), shot noise, and optical beat interference (OBI).

Statistically, noise from all of these effects is reduced if the lasers are operated in burst mode as described in more detail in commonly assigned U.S. patent application Ser. No. 09/027,635 titled: Broadband Communications Method and Apparatus for Reducing Optical Beat Interference, and filed on Feb. 23, 1998, incorporated herein by reference. A special bias-control circuit in the OEC monitors the upstream rf power on the coax bus and biases the laser on only while it detects the presence of an upstream data burst. More laser noise can accumulate at the receiver for FTTH than FTTC because the PON size is greater. However, each OEC laser will be on much less frequently since it transmits the traffic from only one house.

The FTTH OEC connects directly to the in-home coax of one home while the FTTC OEC connects to many homes via one or more intervening coax buses with taps 170 to the homes 180 (FIG. 4). An advantage of the FTTC of the present invention over HFC is that the coax plant is completely passive beyond the OEC. Coax loss increases with frequency. By reducing the amount of coax and eliminating the rf amplifiers, which also exhibit frequency roll-off, the bandwidth of the system of the present invention can be extended beyond that of HFC. The FTTC bandwidth of the present invention is limited to 1 GHz by the limited frequency response of the taps 170, but FTTH bandwidth can extend even further.

The elimination of the coax amplifiers in the present invention also reduces the number of failure points and radically simplifies the design and maintenance of the network. Craft workers who maintain the network need only service one type of active device, the OEC, and the network requires fewer control and balancing elements such as frequency equalizers and temperature compensators. Furthermore, the present invention does not deliver power over the coax network (unless network-powered telephony is implemented), thereby reducing the rate of corrosion. Corrosion causes signal impairment due to rectifying contacts, degraded frequency response, and increased ingress.

The present invention is highly upgradeable; it can be provisioned initially with enough capacity to carry all the services that customers currently demand and, as demand for advanced services grows, the capacity can be increased in a seamless fashion, even on a per customer basis. The FTTH version of the present invention is truly "future proof" in that once a fiber connection is made to the home, it will never need to be replaced. Even an upgrade to a baseband WDM PON could be made without a civil works project. Only the OEC, the headend equipment, and the passive splitter need be replaced, all of which are easily accessed. Although the FTTC implementation of the present invention is less future proof, extensive upgrades can be accomplished in a relatively straightforward manner. Furthermore, upgrades need not be system-wide. Due to the modularity of the present invention, capacity can be increased only where it is needed and even an FTTH upgrade (from FTTC to FTTH) can be implemented on a per customer basis.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The invention claimed is:

1. A method of delivering CATV and data signals in both an upstream and downstream direction between a headend and a service subscriber, comprising the steps of:

combining said CATV and data signals from said headend into a composite optical signal using coarse wavelength division multiplexing of two wavelengths within the same band, a first of said wavelengths being associated with said CATV signals and a second of said wavelengths being associated with said data signals;

transmitting said composite optical signal downstream over a passive optical network (PON) using coarse wavelength division multiplexing (CWDM) to separate said downstream transmission from any upstream transmissions;

converting said transmitted downstream composite optical signal to electrical signals; and routing said electrical signals to said service subscriber for use.

2. A method as set forth in claim 1, wherein said combining step comprises the steps of:

modulating said CATV and said data signals onto subcarriers; and combining said modulated CATV signals and said data signals into said composite optical signal via an optical combiner.

3. A method as set forth in claim 2, wherein said transmitting step comprises the step of dividing said composite optical signal into a plurality of identical composite optical signals for routing to different service subscribers.

4. A method as set forth in claim 3, further comprising the step of performing demultiplexing, ranging, and/or media access control (MAC) on said electrical signal routed to a subscriber using customer provided equipment (CPE) located in the subscriber premises.

5. A method as set forth in claim 4, further comprising the step of transmitting an upstream signal from said service subscriber to said headend using CWDM.

6. A method as set forth in claim 5, wherein said upstream transmission step comprises the steps of:

routing a first upstream electrical signal from said service subscriber to an optical-electrical converter;

converting said upstream electrical signal to an upstream optical signal;

transmitting said upstream optical signal over said PON using CWDM to separate said upstream transmission from any downstream transmissions;

converting said upstream optical signal back to a second upstream electrical signal; and routing said second upstream electrical signal to said headend.

7. A method as set forth in claim 1, wherein said CATV signals include analog and digital broadcast television signals.

8. A method as set forth in claim 7, wherein said digital broadcast television signals are compressed to MPEG-2 format.

9. A method as set forth in claim 7, wherein said analog broadcast television signals are modulated using amplitude modulation with vistidual sideband (AM-VSB).

10. A method as set forth in claim 6, wherein said composite optical signal transmitted downstream has a wavelength of approximately 1550 nm and wherein said upstream optical signal has a wavelength of approximately 1310 nm.

11. A method as set forth in claim 1, wherein said converting step occurs on the premises of said service subscriber.

12. A method of delivering downstream CATV and data signals from a headend to a service subscriber, and for delivering upstream data signals from said service subscriber to said headend, comprising the steps of:
   transmitting said downstream CATV and data signals from said headend along a dedicated downstream network to a combining node;
   combining said CATV and data signals into a composite downstream optical signal and transmitting said composite downstream optical signal over a bi-directional passive optical network (PON) using coarse wavelength division multiplexing (CWDM) to separate said composite downstream optical signal from any upstream optical signals;
   converting said downstream composite optical signal to downstream electrical signals;
   routing said downstream electrical signals to said service subscriber for use;
   wherein said combining is performed using coarse wavelength division multiplexing of two wavelengths within the same band, a first of said wavelengths being associated with said CATV signals and a second of said wavelengths being associated with said data signals.

13. A method as set forth in claim 12, wherein said upstream data signals are delivery to said headend from said service subscriber according to the following steps:
   routing a first upstream electrical signal from said service subscriber to said optical-electrical converter;
   converting said upstream electrical signal to an upstream optical signal;
   transmitting said upstream optical signal over said bi-directional PON using CWDM to separate said upstream optical signal from any downstream optical signals;
   converting said upstream optical signal to a second upstream electrical signal; and
   routing said second upstream electrical signal to said headend along a dedicated upstream network.

14. A method as set forth in claim 13, wherein said converting steps occur on the premises of said service subscriber.

15. An apparatus for delivering CATV and data signals from a headend to a service subscriber, comprising:
   an optical combiner connected to receive said CATV and data signals from said headend said optical combiner using coarse wavelength division multiplexing of two wavelengths within the same band, a first of said wavelengths being associated with said CATV signals and a second of said wavelengths being associated with said data signals;
   a passive optical network (PON) connected to receive output from said optical combiner; and
   an optical-electrical converter (OEC) connected to said PON, wherein said CATV and data signals are combined into a composite downstream optical signal and transmitted via said PON to said OEC using coarse width division multiplexing (CWDM), to separate said composite downstream optical signal from any upstream optical signals, and then delivered to said service subscriber for use.

16. An apparatus as set forth in claim 15, further comprising:
   a receiver connected between said PON and said headend, said receiver receiving upstream signals from said service subscriber via said PON and routing said received upstream signals to said headend.

17. An apparatus for delivering CATV and data signals to a subscriber, comprising:
   a headend;
   a hub connected to said headend, said hub including a dedicated downstream network using coarse width division multiplexing to combine said CATV and data signals using two wavelengths within the same band, a first of said wavelengths being associated with said CATV signals and a second of said wavelengths being associated with said data signals and a dedicated upstream network using coarse width division multiplexing (CWDM) to separate said CATV and data signals from any upstream signals;
   a passive optical network (PON) connected to said hub;
   an optical-electrical converter (OEC) connected to said PON; and
   customer provided equipment (CPE) connected to an output of said OEC, said CPE performing demultiplexing, ranging, and/or media access control (MAC) on a downstream signal transmitted from said headend.

18. An apparatus as set forth in claim 17, wherein said OEC is attached directly to the premises of said subscriber.

19. An apparatus as set forth in claim 17, wherein said hub comprises:
   means for amplifying said CATV and data signals; and
   means for combining said amplified CATV and data signals into a single composite optical signal for transmission over said PON using CWDM.

20. An apparatus as set forth in claim 19, wherein said hub further comprises a coarse wavelength division multiplexer for transmitting said single composite optical signal over said PON separate from any upstream signals.

21. An apparatus for delivering CATV and data signals to a subscriber, comprising:
   a headend;
   a hub connected to said headend, said hub including a dedicated downstream network and a dedicated upstream network;
   a passive optical network (PON) connected to said hub;
   an optical-electrical converter (OEC) connected to said PON; and
   customer provided equipment (CPE) connected to an output of said OEC, said CPE performing demultiplexing, ranging, and/or media access control (MAC) on a downstream signal transmitted from said headend;
   and wherein said hub further comprises:
      means for amplifying said CATV and data signals;
      means for combining said amplified CATV and data signals into a single composite optical signal for transmission over said PON;

a coarse wavelength division multiplexer for transmitting said single composite optical signal over said PON;

an upstream optical combiner coupled to said coarse wavelength division multiplexer;

a receiver connected to an output of said upstream optical combiner; and a demodulator coupled to an output of said receiver, whereby an upstream signal transmitted across said PON from said subscriber is directed by said coarse wavelength division multiplexer to said upstream optical combiner and received by said receiver, where it is routed to said demodulator for conversion to an electrical signal and delivery to said headend.

22. An apparatus for delivering CATV and data signals to a subscriber, comprising:

a headend;

a hub connected to said headend, said hub including a dedicated downstream network and a dedicated upstream network;

a passive optical network (PON) connected to said hub;

an optical-electrical converter (OEC) connected to said PON; and customer provided equipment (CPE) connected to an output of said OEC, said CPE performing demultiplexing, ranging, and/or media access control (MAC) on a downstream signal transmitted from said headend;

and wherein said hub further comprises:

means for amplifying said CATV and data signals; and means for combining said amplified CATV and data signals into a single composite optical signal for transmission over said PON.

* * * * *